United States Patent [19]

Altes

[11] Patent Number: 5,303,269
[45] Date of Patent: Apr. 12, 1994

[54] OPTICALLY MAXIMUM A POSTERIORI DEMODULATOR

[75] Inventor: Richard A. Altes, La Jolla, Calif.

[73] Assignee: Chirp Corporation, La Jolla, Calif.

[21] Appl. No.: 607,582

[22] Filed: Nov. 1, 1990

[51] Int. Cl.$^5$ ............................................. H03D 3/00
[52] U.S. Cl. ...................................... 375/78; 375/80; 330/252
[58] Field of Search .................. 375/78, 80, 82, 84; 329/300, 303, 304, 310; 330/252

[56] References Cited

U.S. PATENT DOCUMENTS

| | | | |
|---|---|---|---|
| 4,554,509 | 11/1985 | Cornett | 329/105 |
| 4,656,648 | 4/1987 | Vallet | 375/80 |
| 4,660,166 | 4/1987 | Hopfield | 364/807 |
| 4,719,591 | 1/1988 | Hopfield et al. | 364/807 |
| 4,809,193 | 2/1989 | Jourjine | 364/513 |
| 4,847,871 | 7/1989 | Matsushita et al. | 375/94 |
| 4,866,739 | 9/1989 | Agazzi et al. | 375/106 |
| 4,873,661 | 10/1989 | Tsividis | 364/807 |
| 4,885,757 | 12/1989 | Provence | 375/96 |
| 5,001,724 | 3/1991 | Birgenbeier et al. | 329/304 |

OTHER PUBLICATIONS

"Maximum Posterior Probability Demodulation of Angle-Modulated Signals", D. W. Tufts and J. T. Francis, IEEE Transactions on Aerospace and Electronic Systems, vol. AES-15, No. 3, Mar. 1979, pp. 219-227.

"Electronic Implementation of Associative Memory Based on Neural Network Models", A. Moopenn, John Lambe, and A. P. Thakoor, IEEE Transactions on Systems, Man and Cybernetics, vol. SMC-17, No. 2, Mar.-Apr., 1987, pp. 325-331.

"Programmable Synaptic Devices for Electronic Neural Nets", A. Moopenn and A. P. Thakoor, Proc. 5th IASTED Int'l Conf. on Expert Systems and Neural Networks, Aug., 1989, pp. 36-40.

"Optical Implementation of the Hopfield Model", N. H. Farhat, D. Psaltis, A. Prata, and E. Paek, Applied Optics 24 (1985), pp. 1469-1475.

"Simple 'Neurtal' Optimization Networks: An A/D Converter, Signal Decision Circuit, and a Linear Programming Circuit", David W. Tank and John J. Hopfield, IEEE Transactions on Circuits and Systems, vol. CAS-33, No. 5, May, 1986, pp. 533-541.

"Unconstrained Minimum Mean-Square Error Parameter Estimation with Hopfield Networks", Richard A. Altes, IEEE International Conference on Neural Networks, San Diego, Calif., Jul. 1988.

Primary Examiner—Curtis Kuntz
Assistant Examiner—T. Ghebretinsae
Attorney, Agent, or Firm—Knobbe, Martens, Olson & Bear

[57] ABSTRACT

A system and method for optimal maximum a posteriori (MAP) demodulation. The present invention incorporates neural network technology, i.e., a Hopfield network, (1) to replace the function of the traditional, suboptimal phase-locked loop in an FM receiver and/or (2) to optimally estimate a discrete phase value using an expected value (obtained from the mean of the prior probability distribution of the phase) and statistical dependence between different phase values in a block of samples (described by the covariance matrix of the prior phase distribution). The definition of the Hopfield network includes particular bias currents, feedback weights and a sigmoid function for solving the nonlinear integral equation associated with optimal demodulation. The present invention also includes a signal classifier having a plurality of angled modulators for modeling different phase modulation processes.

26 Claims, 8 Drawing Sheets

OPTICALLY MAXIMUM A POSTERIORI DEMODULATOR

STATEMENT REGARDING GOVERNMENTAL RIGHTS

The present invention was made with support from the United States Government under Contract No. DAAH01-89-C-0293 awarded by the Defense Advanced Research Projects Agency via the U.S. Army Missile Command. The Government has certain rights in the invention.

BACKGROUND OF THE INVENTION

1. Field of the Invention

The present invention relates to communications systems and, more particularly, to phase angle demodulators.

2. Description of the Related Technology

Most electronic communication systems in use today include a transmitter to transmit an electromagnetic signal and a receiver to receive the transmitted signal. The transmitted signal is typically corrupted by noise and, therefore, the receiver must operate with received data that reflects the combination of the transmitted signal and noise. Thus, the receiver receives data y(t) at a time t, where y(t)=s(t)+n(t), the sum of the transmitted signal and additive noise. The received data equation can be expanded as follows:

$$y(t) = \sqrt{2} A \cos[\omega_o t + \theta(t)] + n(t) \quad (1)$$

where A is the signal amplitude, $\omega_o$ is the carrier or reference frequency, $\theta(t)$ is the time-varying phase function and n(t) is noise.

Many of these communication systems require that the receiver demodulate information in the received signal which depends on proper demodulation of the signal phase angle at all times during transmission. The demodulation of the signal phase angle is problematic in view of the pervasiveness of noise. Therefore, for this class of receivers it is desirable to optimize phase demodulation, which is equivalent to optimizing an estimation of the phase function $\theta(t)$.

Among the class of receivers which rely on accurate phase demodulation are current high quality frequency modulated (FM) receivers. Such FM receivers typically use phase-locked loops, or PLLs, for phase demodulation. A phase-locked loop is a circuit that consists of a phase detector which compares a frequency of a voltage-controlled oscillator (VCO) with that of an incoming carrier signal. A phase-error signal output by the phase detector, after passing through a linear filter, is fed back to the voltage-controlled oscillator to keep the oscillator generated frequency "locked" in a fixed phase relationship with the input or reference frequency. The phase-error signal output of the linear filter is a low frequency (baseband) signal that is proportional to the input frequency and, thus, represents the demodulated information in the FM signal.

Systems incorporating phase-locked loops are suboptimal since the phase-locked loop is a "causal" system. A system is causal if the output at any given time depends only on values of the input at the present time and in the past. Such a system can also be referred to as "nonanticipative", as the system output does not anticipate future values of the input.

Ideally, then, a noncausal receiver makes an estimate of the phase function $\theta(t)$, given phase samples $\theta(k\Delta)$, $k=1,2,\ldots,K$ where $\Delta$ is a sampling period, in an optimal manner known as maximum a posteriori (MAP) estimation. Such phase samples based on noisy data can be measured by the extraction of in-phase (I) and quadrature (Q) components from the data which determine a measured phase angle according to the arctangent operation $\tan^{-1}(Q/I)$.

The optimization of phase demodulation can then be expressed as minimizing the mean-squared error between the phase estimate $\hat{\theta}(\tau)$ and the correct phase value $\theta(\tau)$, with extra information provided by the mean phase $\theta_m(\tau)$ of the prior (a priori) phase distribution. This approach implies that the receiver must solve a nonlinear integral equation as follows:

$$\hat{\theta}(\tau) - \theta_m(\tau) = -\frac{2\sqrt{2}}{N_0} A \int_{t_0}^{t} y(\sigma)\sin[\omega_o\sigma + \hat{\theta}(\sigma)]R_\theta(\tau - \sigma)d\sigma, \; t_0 \leq \tau \leq t \quad (2)$$

where $\hat{\theta}(\tau) - \theta_m(\tau)$ is the difference between the phase estimate $\hat{\theta}(\tau)$, at a time $\tau$, $t_0 \leq \tau \leq t$, and the prior mean phase $\theta_m(\tau)$ at time $\tau$, $N_0/2$ is the noise power spectral density, $\sigma$ is time, and $R_\theta(\tau - \sigma)$ is the phase covariance function defined as the expected value $E\{[\theta(\tau) - \theta_m(\tau)][\theta(\sigma) - \theta_m(\sigma)]\}$. If sampled values of $\theta(\tau)$ are used to form a column vector $\underline{\theta}$, then a sampled version of $R_\theta(\tau - \sigma)$ can be obtained from the phase covariance matrix $E[(\underline{\theta} - \underline{\theta}_m)(\underline{\theta} - \underline{\theta}_m)^T]$.

The use of a phase-locked loop (PLL) for phase estimation, as for example shown in FIG. 1, follows from the similarity of the loop equation, equation (3) below, to the estimate in equation (2). The loop equation, which is implemented as a phase-locked loop, is described by the following equation:

$$e(\tau) = \sqrt{2} \int_{-\infty}^{\tau} y(\sigma)\sin[\omega_o\sigma + e(\sigma)]f(\tau - \sigma)d\sigma \quad (3)$$

where $f(\tau)$ is the impulse response of the linear filter in the PLL. Equations (2) and (3) are similar if $\theta_m(t)$ is either 0 or is added to the estimate obtained from the loop equation. Although the equations are superficially similar, they differ in that whereas the phase-locked loop uses information in the interval $[-\infty, \tau]$, the optimum demodulator uses all of the information in the observation integral $[t_0, t]$ to determine the phase estimate at time $\tau$.

The optimum estimation process is thus noncausal. That is, "future" samples of the signal in the interval $[\tau, t]$, from the MAP estimation (Equation (2)), are used to determine the phase at a given time. On the other hand, the phase locked-loop is a realizable but suboptimal version of the ideal estimator due to its inherent causality.

Another shortcoming of the phase-locked loop is that it is difficult to incorporate a time-varying signal amplitude A(t) and/or time-varying noise power $\sigma_n^2(t) = E[y(t) - s(t)]^2$, i.e., the variance between the received data and the transmitted signal. There are many non-ideal environments in which such variations occur. In fact, fading (signal amplitude fluctuations) and time-dependent noise power are phenomena that are prevalent in mobile receivers such as aircraft and automobiles.

D. W. Tufts and J. T. Francis proposed a numerical method to more closely approach the performance of an optimal MAP phase angle estimator by using a combination of block processing and a priori phase information obtained from past data samples ("Maximum Posterior probability Demodulation of Angle-Modulated Signals", IEEE Transactions on Aerospace Electronic Systems, AES-15 (1979), pp. 219-227). Instead of processing samples one at a time, the Tufts and Francis block process uses a sequence of samples from a time interval defined by a block. An estimated phase sample at the beginning of the interval can thus be influenced by data samples at the end of the interval, emulating the desired noncausal process.

In such a block process, the demodulated phase samples are available after the complete block has been processed. This implies that there is a delay of up to one block length between a data sample and the corresponding phase estimate. Nonetheless, such a delay can be so small as to be unnoticeable in a two-way communication system, and is irrelevant to one-way systems such as consumer radios, televisions receivers and facsimile machines.

For block processing in linear signal estimators, the error of a time invariant signal can be reduced by averaging noisy samples over the duration of the block. For linear estimation of a time-varying signal, the averaging process is replaced by filtering, where the filter is based on the expected correlation between signal samples. The same correlation information can be used to predict a given sample from past data, and a MAP estimator often forms a weighted sum of a prediction based on past data and filtered, demodulated samples from the current data block.

For phase estimation, the nonlinear division and arctangent operation over quadrature components (I, Q) necessitate a more complicated nonlinear filtering process in order to combine a block of measured, noisy phase samples $\alpha(j\Delta)$ so as to reduce the phase-error of each sample. The discrete time equation for the MAP phase estimate at a time $k\Delta$ is as follows:

$$\hat{\theta}(k\Delta) - \theta_m(k\Delta) + \quad (4)$$

$$\sigma_n^{-2} A \sum_{j=1}^{K} |y(j\Delta)| R_\theta[(k-j)\Delta] \sin[\hat{\theta}(j\Delta) - \alpha(j\Delta)] = 0$$

Equation (4) is obtained from equation (2) by defining $y(j\Delta) = |y(j\Delta)| \cos[\omega_0 j\Delta + \alpha(j\Delta)]$. Tufts and Francis described the iterative method to solve equation (4) (given in equation (5) below).

The phase estimation process uses a weighted sum of a phase sample $\theta_m(k\Delta)$ predicted from past data and a processed version of the measured phase samples $\alpha(j\Delta)$ from the current data block. However, the operation that must be applied to current phase samples is difficult to implement because the desired MAP phase estimate $\hat{\theta}(k\Delta)$ from the current data block is a filtered version of a nonlinear (sine function) version of the same desired phase estimate, as well as desired estimates at other sampling times within the data block. Thus, because of the processing time and complexity involved, the iterative MAP estimation method is inefficient for practical, real-time receivers which employ standard, sequential instruction execution, or von Neumann, computers.

Recent innovations in parallel distributed processing based on fundamental biological notions about the human brain present an alternative to von Neumann computers. These so-called neural networks have been demonstrated to solve, or closely approximate, very difficult nonlinear optimizations. One of the original neural networks, as disclosed in Hopfield (U.S. Pat. No. 4,660,166) is a crossbar network of operational amplifiers which is shown to be used as an associative memory. A subsequent patent to Hopfield, et al. (U.S. Pat. No. 4,719,591) incorporates a second interconnection network for decomposing an input signal comprising one or more input voltages, in terms of a selected set of basis functions.

As defined herein in the present disclosure, a Hopfield network (also called a crossbar network) comprises a set of amplifiers, typically including operational amplifiers, that are interconnected by feedback lines. The output of each operational amplifier is nonlinearly filtered so that the output voltage of each amplifier lies in the unit interval [0,1]. Network stability is assured because the maximum voltage at each output is thereby limited.

The network amplifiers are fed by a set of bias currents, {b}, which are generated external to the network optional configuration, a set of variable gain amplifiers are interposed in the feedback lines. The gain on each amplifier is adjusted by a set of feedback weights, {T}. Thus, given input comprising bias currents and feedback weights, the network will eventually converge to a stable state in which the output voltages of the amplifiers remain constant and represent a solution to the specific input data and application. Hopfield networks have been applied to receivers such as those of Vallet (U.S. Pat. No. 4,656,648) and Provence (U.S. Pat. No. 4,885,757) but none have used a Hopfield network for phase angle demodulation, and none have used the specific nonlinearity required for such an application.

In summary, phase angle demodulation is fundamental to many communication systems and FM radio receivers. Currently, high quality FM receivers use phase-locked loops for demodulation, but these systems are theoretically suboptimal. The optimal demodulator must solve a nonlinear integral equation. As is well known, such an integral solution is difficult to achieve in real-time. If a simple analog or digital circuit could be found to more closely approximate the desired optimal demodulator, such a circuit would improve demodulation performance thereby replacing the traditional phase-locked loop found in high performance radio, television and communication systems. It would be an additional benefit if a signal detector-classifier could make use of such a proposed circuit to thereby correlate the estimated phase of the received signal against the phase of a synthesized signal vis-a-vis the standard linear Wiener or Kalman filter methods of correlating the signals themselves.

SUMMARY OF THE INVENTION

The above-mentioned needs are satisfied by the present invention which includes a system and method for optimal maximum a posteriori (MAP) angle demodulation. The system described herein uses a set of amplifiers interconnected via feedback (referred to herein as a Hopfield or crossbar network) to quickly solve the angle demodulation equation, and thus obtain optimal phase estimates.

One preferred embodiment of the present invention is an angle demodulator comprising a network having a plurality of amplifiers each amplifier having a plurality of inputs, a bias, b, and an output wherein a set of feedback lines are connected between a selected set of amplifier outputs and a selected set of amplifier inputs, and block processing means for iteratively setting each amplifier bias as a function of the difference between a predicted mean phase estimate $\theta_m(j\Delta)$ and a measured phase $\alpha(j\Delta)$ at a time $j\Delta$, where $1 \leq j \leq K$ for a K-sample data block and $\Delta$ is a sampling period of a signal time sample $y(j\Delta)$.

In another preferred embodiment, the system requires that specific operational amplifier bias currents and feedback weights be determined by input data, and that the sigmoid nonlinearity at each of the amplifier outputs have a specific functional form. The MAP angle demodulator requires such a network to quickly perform the disclosed iteration equation on a block of received data samples so as to converge to a stable state corresponding to the maximum a posteriori estimates of a sequence of phase samples $\theta(k\Delta)$, $k=1, 2, \ldots, K$ within a K-sample block. Thus, a corresponding nonlinear filtering operation involving the difference $\hat{\epsilon}(k\Delta) = \hat{\theta}(k\Delta) - \alpha(k\Delta)$ between estimated phase samples $\hat{\theta}(k\Delta)$ and measured phase samples $\alpha(k\Delta)$ is quickly implemented using the Hopfield network. Each desired phase sample $\hat{\theta}(k\Delta)$ can be obtained by adding the corresponding measured phase sample $\alpha(k\Delta)$ to the difference value $\hat{\epsilon}_\infty(k\Delta)$ ($\infty$ indicating the final state of convergence) determined by the Hopfield network.

The disclosed system and method generalize the previous MAP results for angle demodulation by incorporating time dependent (non-stationary) signal and noise power, as well as an estimate of this power. Since the present invention more heavily weights samples with high signal-to-noise ratio (SNR), theoretically, it will significantly out-perform other demodulation techniques including the phase-locked loop.

However, the phase-locked loop can still be used in application receivers as a pre-processor for estimating some of the signal parameters that are used in the optimum demodulator, namely, time-varying amplitude and noise power. Other parameters, including the predicted mean phase, can be predicted from past data with the help of an operation that uses past estimates to update information about the demodulated signal. This updated information, in the form of estimated signal covariance values, can also be used directly in the optimal demodulator. The receiver can thus "learn" to better demodulate a given type of signal, e.g., voice, music, a specific kind of acoustic or electromagnetic emission, or a sequence of phase shifts, as it performs a demodulation task. The learning process of the present invention is applicable to phase, frequency and amplitude demodulation.

In addition to communications applications, the MAP phase demodulator can be used as a detector-classifier of random (stochastic time series) data. In these applications, different phase modulation processes are represented by different phase covariance functions implemented in a parallel set of demodulators. A model of the received signal is synthesized from each demodulator output, and the corresponding signal models are correlated with the original input data. The correlator with the largest output indicates the best match between the synthesized signal and the actual data. The largest correlator output is compared with a predetermined threshold in order to detect the signal, and the signal is classified in accordance with the largest correlator output if the threshold is exceeded. This receiver configuration is an example of an estimator-correlator configuration for detection/classification of random signals. However, the disclosed system differs from standard estimator-correlators in that the covariance of the phase function is specified, rather than the covariance of the data samples themselves.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the drawings wherein like numerals refer to like parts throughout.

Figure 1:
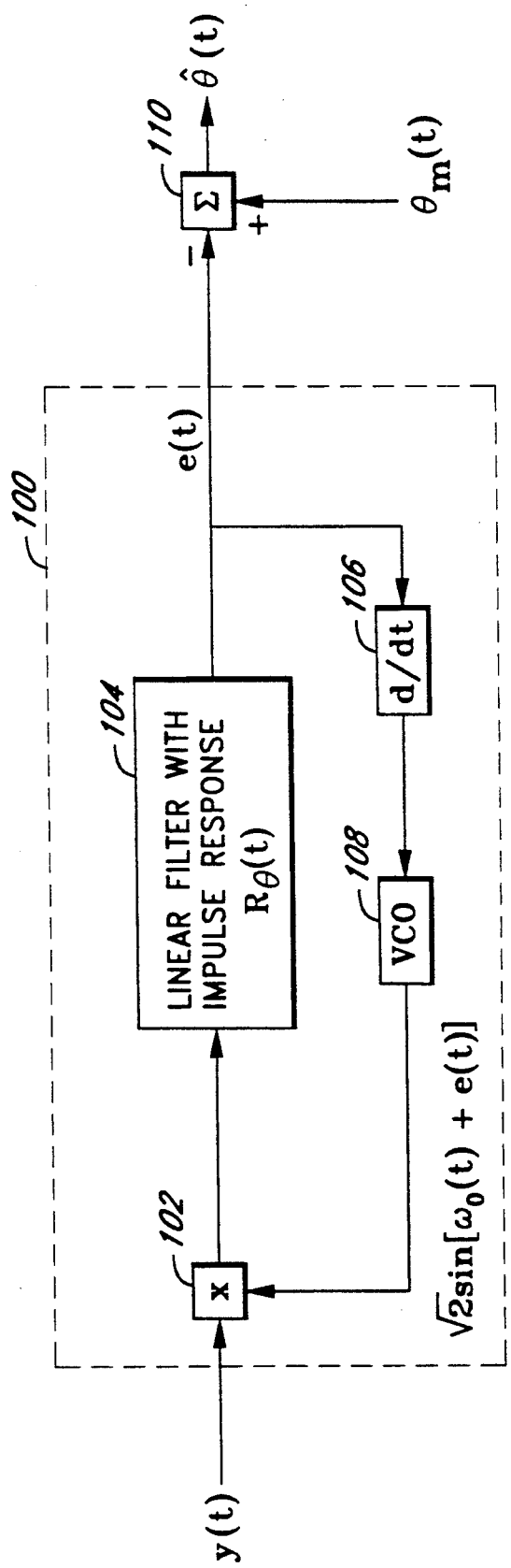
FIG. 1 is a block diagram of a conventional phase-locked loop.

FIG. 1 is a block diagram of a phase-locked loop 100 which is known in the prior art. The input to the phase locked loop 100 is received signal data y(t) as defined in equation (1). The received signal in many applications is an FM signal, such as that generated by a radio station, that is received via an antenna.

The received signal data is correlated with the generated carrier signal at a phase-detector 102. The carrier signal generated by the phase-locked loop 100 is a periodic function that results from system feedback. The signal that is output by the phase detector 102 is fed into a linear filter 104 having an impulse response defined by the phase covariance matrix, $R_\theta(t)$. The output of the linear filter 104 is the phase-error signal e(t) as defined in equation (3).

The carrier signal, which is one of the inputs to the phase-detector 102, is generated by a feedback path which originates from the output of the linear filter 104. Thus, the phase-error signal is fed into a device that measures the rate of change of the phase-error, as indicated at a derivative block, or differentiator 106. The output of the derivative block 108 controls a voltage-controlled oscillator 110 which generates the carrier signal.

The phase-error signal which results from the phase-locked loop 100 is fed to an inverting input of a summing amplifier 110. The other input of the summing amplifier 110 is received from an outside source (not shown) as a predicted mean signal phase $\theta_m(t)$. Thus, the output of the summing amplifier 110 is an estimated phase $\hat{\theta}(t) = \theta_m(t) - e(t)$.

An iterative procedure to obtain a maximum a posteriori (MAP) estimate of the phase angle is to find a stable state such that $\hat{\theta}_{i+1}(k\Delta) \approx \hat{\theta}_i(k\Delta)$ for a sequence of phase estimates or, mathematically, to minimize the following equation:

$$\hat{\theta}_{i+1}(k\Delta) = \hat{\theta}_i(k\Delta) - \mu \left\{ \hat{\theta}_i(k\Delta) - \theta_m(k\Delta) + \sum_{j=1}^{K} \sigma_n^{-2}(j\Delta) A(j\Delta) |y(j\Delta)| R_\theta[(k-j)\Delta] \sin[\hat{\theta}_i(j\Delta) - \alpha(j\Delta)] \right\} \quad (5)$$

Equation (5) is an iterative process for block MAP phase estimation, given amplitude $|y(j\Delta)|$ and phase measurements $\alpha(j\Delta)$ obtained from the signal data $y(j\Delta)$, an assumed (or estimated) phase covariance function $R_\theta(\tau)$, noise power measurement $\sigma_n^2(j\Delta)$, signal amplitude $A(j\Delta)$, and the parameter $\theta_m(k\Delta)$, which is the mean of the a priori phase distribution before observing current data.

If $\theta_m(k\Delta)$ is interpreted as the conditional, or predicted, mean of the phase distribution at time $k\Delta$ based on phase estimates obtained before time $k\Delta$, then $\theta_m(k\Delta)$ can be computed via regression (linear prediction) from prior phase estimates, again using $R_\theta(\tau)$. The predicted mean phase is accentuated if the signal-to-noise ratio (SNR) over the current block of data samples is low. Also, it will be appreciated that samples within the block with relatively high SNR have greater influence than those with low SNR.

For block MAP processing, the size K of each received signal data block should ideally be such that $K\Delta$ is at least as large as the duration of $R_\theta(\tau)$, so that correlated phase samples on both sides of a given sample contribute to the estimated phase of the sample by way of the phase covariances $R_\theta(\tau)$. Even with a sufficiently large block size, however, estimated phase samples near the left (early) edge of a block will be influenced primarily by later data samples, rather than by both earlier and later samples, as desired. Similarly, samples near the right (late) edge of a block will be influenced primarily by earlier data. This is because the estimated phase value at time sample $k\Delta$ is based on data samples within the block containing sample $k\Delta$, according to equation (5). If $k\Delta$ is at the beginning of a block (k=1) or end of a block (k=K), the estimated phase sample depends primarily on later or earlier data samples, respectively.

Figure 2A:
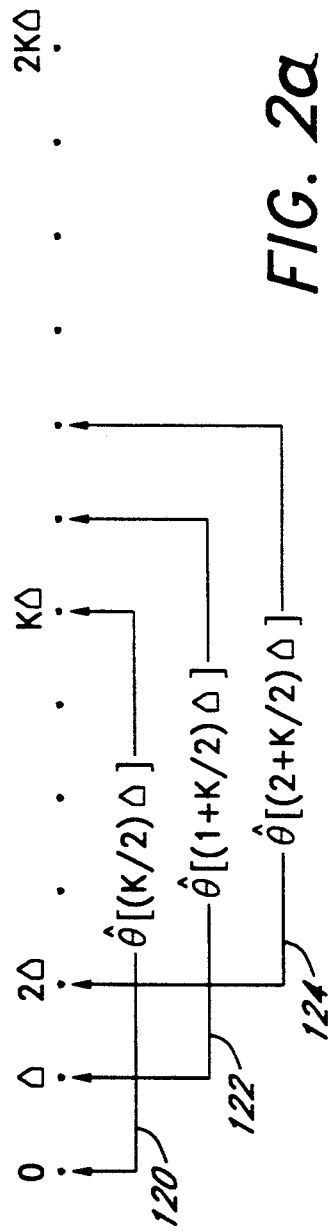
FIGS. 2a, 2b are representations of large overlap and fifty percent overlap means of making phase estimates with K-sample data blocks using the principles of the present invention.
Figure 2B:
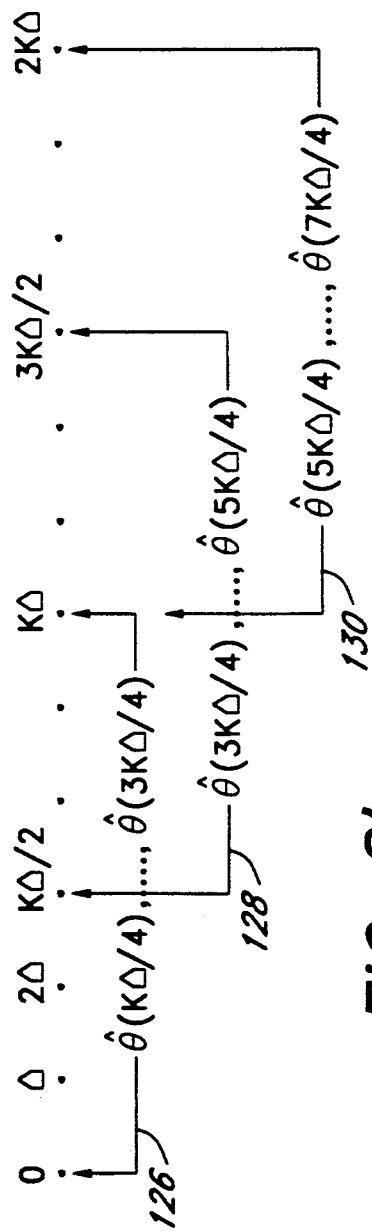

Referring now to FIG. 2a, the problem of asymmetric sample contributions to estimated phase can be solved by placing each received data sample at the center of its own block, so that blocks have very large overlap. For example, the sample blocks centered about $(K/2)\Delta$, $(1+K/2)\Delta$ and $(2+K/2)\Delta$, referred to respectively at 120, 122, 124 in FIG. 2a, are one representation of how data samples would be processed in a phase angle demodulator according to the present invention. As shown in FIG. 2b at 126, 128, 130, a compromise between non-overlapping and overlapping configuration, e.g., that shown in FIG. 2a, is to use blocks with fifty percent overlap, and to only save phase estimates from the middle half of each block.

Figure 3:
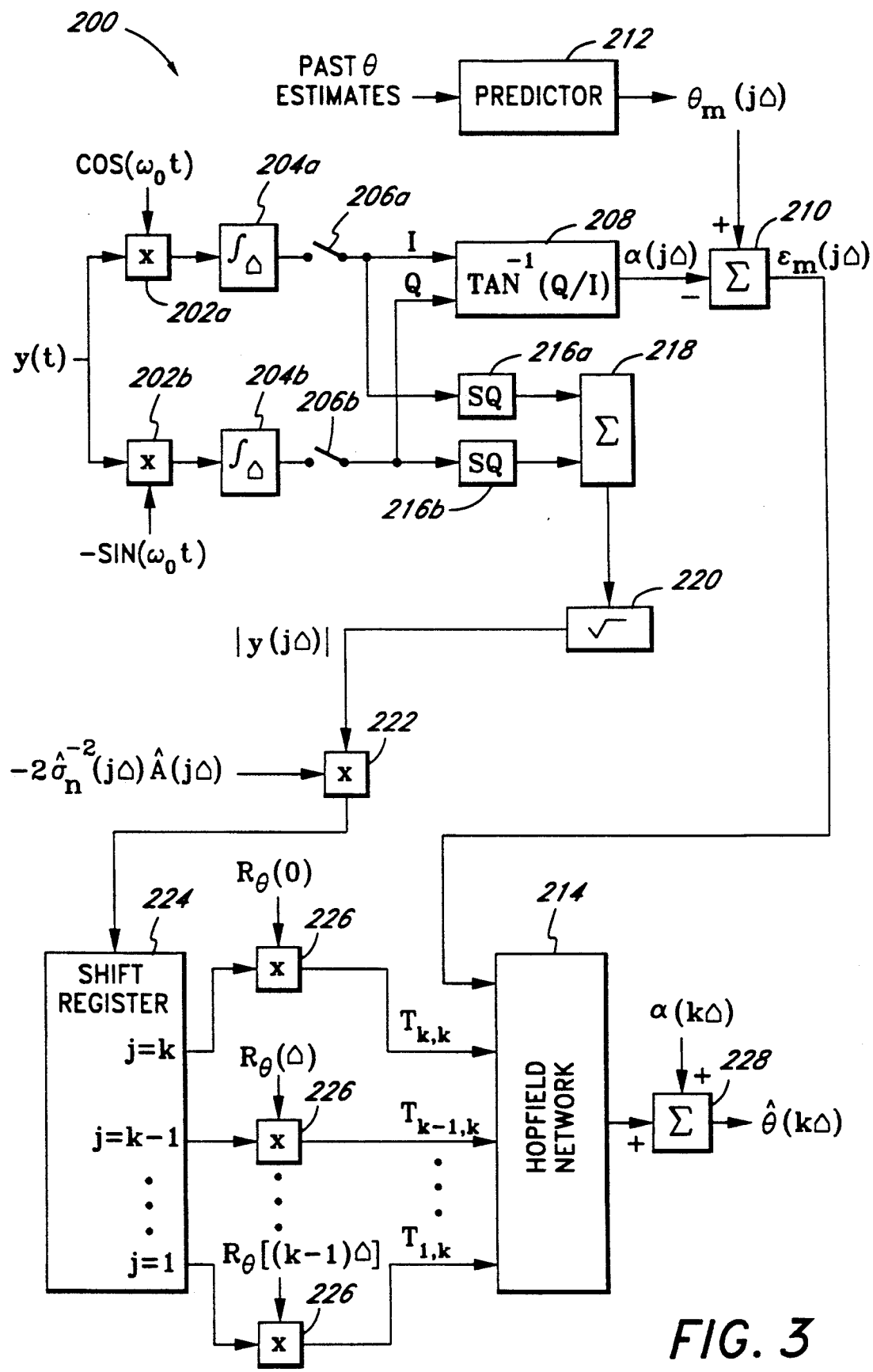
FIG. 3 is a block diagram of one presently preferred embodiment of a maximum a posteriori (MAP) angle demodulator of the present invention, using a Hopfield network.

FIG. 3 illustrates one preferred embodiment of a maximum a posteriori (MAP) angle demodulator 200. The angle demodulator 200 relies upon the fundamental result of the present invention: the irerative equation for block MAP phase estimation can be realized by a Hopfield network (mathematically represented below in equation (15)). The Hopfield network is provided with inputs (the feedback weights $T_{jk}$ and bias currents $b(k)$ defined, respectively, in equations (17) and (18) below) that represent a time-series $k\Delta$, $1 \leq k \leq K$ of functions of sampled phase $\alpha(k\Delta)$, sampled amplitude $|y(k\Delta)|$, predicted mean phase $\theta_m(j\Delta)$, phase covariances $R_\theta[(k-j)\Delta]$ and, optionally, estimates of time-varying signal amplitude $A(t)$ and/or time-varying noise power $\sigma_n^2(t)$. Based thereon the network performs a nonlinear filtering operation to arrive at the phase difference $\epsilon(k\Delta)$ between the estimated phase $\hat{\theta}(k\Delta)$ and the sampled phase. Thereafter, the sampled phase $\alpha(k\Delta)$ is added to the outputs of each sample in the K-sample block to arrive, in a maximum a posteriori sense, at predicted phases for each sample.

Thus, in the angle demodulator 200 of FIG. 3, to establish a time-series of signal samples, the received signal data $y(t)$ is fed into two parallel paths, beginning at a pair of multipliers 202a,b so as to decompose the received signal into its in-phase (I) and quadrature (Q) components (hereinafter collectively referred to as quadrature components). The multiplier 202a multiplies the cosine of the product of carrier frequency and time t, $\cos(\omega_0 t)$, by the received signal data to obtain the inphase component thereof. Similarly, the multiplier 202b multiplies the received signal data by $-\sin(\omega_0 t)$ to obtain the quadrature component of the received data. The quadrature components are then independently integrated by a pair of integrators 204a,b. The outputs of the integrators 204a,b are sampled by a pair of sampling circuits 206a,b, respectively. The sampling circuits 206a,b sample the integrator outputs at a predetermined interval $\Delta$.

The sampled quadrature components are fed by the sampling circuits 206a,b into an arctangent circuit 208 which performs the function arctan(Q/I). Thus, the output of the arctangent circuit 208 is a time series of phase samples $\alpha(j\Delta)$ of the received signal, which include additive noise. In one preferred embodiment, the arctangent function could be implemented with a lookup table memory wherein the value Q/I would address prestored values corresponding to the result of the arctangent function.

The phase samples $\alpha(j\Delta)$ are fed into the inverting input of a summing amplifier 210. The other input of the summing amplifier 210 is fed by the output of a phase predictor 212. The phase predictor 212 receives estimates of the past phase angle estimates and generates a predicted mean phase $\theta_m(j\Delta)$ based thereon. The output of the summing amplifier 210 is a sequence of errors that contribute to the bias currents of a Hopfield, or crossbar, network 214. The structure and function of the Hopfield network 214 is more fully discussed below with reference to FIGS. 4 and 5.

In FIG. 3, to achieve a sample amplitude $|y(j\Delta)|$, a parallel path for the sampled quadrature components obtained from the circuits 206a,b is provided beginning at a pair of squaring circuits 216a,b. The values output by the squaring circuits 216a,b are then input into a summing amplifier 218. The sum of the squares output by the summing amplifier 218 is applied to the input of a square root circuit 220 which thus provides as output a sample amplitude $|y(j\Delta)|$.

The sample amplitude is fed into a multiplier 222 which multiplies the amplitude by scaling factors comprising an estimate of time-varying inverse noise power samples separated by $\Delta$ seconds $\hat{\sigma}_n{}^{-2}(j\Delta)$ and an estimate of the time-varying signal amplitude $\hat{A}(j\Delta)$. One preferred means to obtain these estimated parameters is presented in FIG. 7 and the discussion directed thereto.

One skilled in the relevant technology will recognize that the angle demodulator 200 may also be configured without the time-varying inputs. However, such scaling factors are desirable for certain applications including mobile receivers as previously discussed.

Continuing to refer to FIG. 3, each scaled sample amplitude output by the multiplier 222 is fed into a shift register 224. The shift register 224 thus saves a sequence of scaled amplitude values in the chronological order: $j=\Delta,2\Delta,\ldots,k\Delta$. The parallel outputs of the shift register 224 are used to feed the scaled amplitude samples into a set of multipliers 226 which multiply the stored scaled amplitude values by the phase covariance matrices $R_\theta[(k-j)\Delta]$. These matrices can be updated over time so that the system "learns" or adapts to a particular type of transmission, e.g., an FM radio station broadcasting Bizet's Carmen. One preferred mechanism to determine the covariance parameters is discussed below with respect to equations (28) and (29).

FIG. 3 also shows that the outputs of the multipliers 226 are the feedback weights $T_{jk}$ that are fed into the Hopfield network 214. Since the process of obtaining a MAP phase estimate $\hat{\theta}(k\Delta)$ is iterative, the Hopfield network must be allowed to converge after each sample is input into the angle demodulator 200, based upon the surrounding K-sample block which affects the biases $b(k)$ and the feedback weights $T_{jk}$.

After convergence, the output of the Hopfield network 214 is a phase error $\epsilon_\infty(k\Delta)=\hat{\theta}(k\Delta)-\alpha(k\Delta)$ which is fed into a summing amplifier 228 and added to the phase sample $\alpha(k\Delta)$, thus achieving the estimated phase $\hat{\theta}(k\Delta)$ of the received data $y(t)$ at time $k\Delta$.

Figure 4:
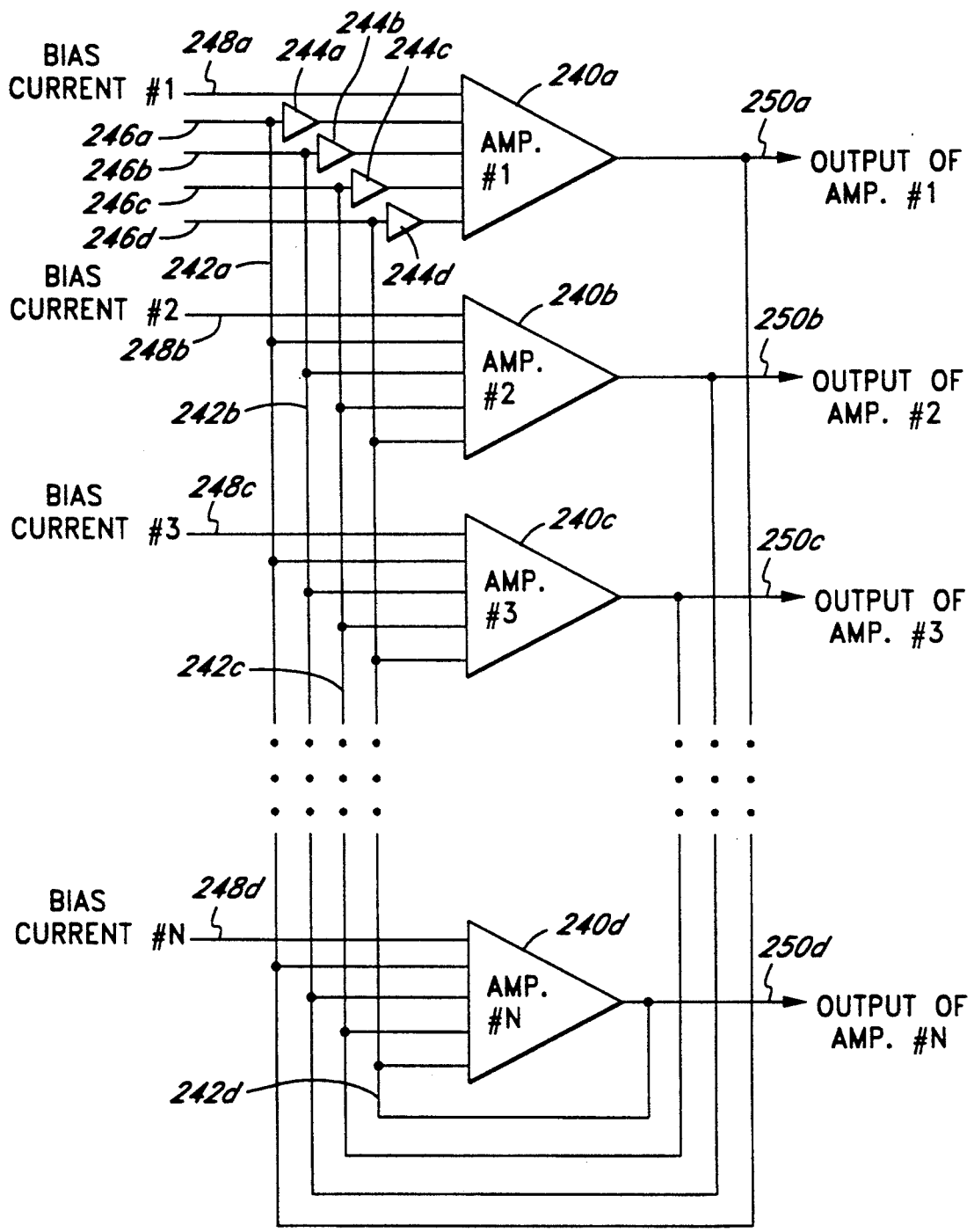
FIG. 4 is a block diagram of the Hopfield network shown in FIG. 3.

FIG. 4 illustrates a general configuration of a Hopfield, or crossbar, network such as indicated at 214 in FIG. 3. The generalized network comprises a set of N amplifiers, represented in FIG. 4 by the four amplifiers 240a,b,c,d. In a preferred embodiment of the present invention, the amplifiers of the Hopfield network 214 are implemented by operational amplifiers having an output voltage determined by a nonlinear function of the input voltage. The operational amplifiers may contain nonlinear filtering circuitry, or, as described herein, additional nonlinear filtering circuitry (not shown) may be fed by the outputs of the operational amplifiers 240. In any event, unless otherwise specified, the combination of operational amplifier and nonlinear filter will hereinafter be referred to collectively as an amplifier.

The amplifiers 240 are interconnected by a set of feedback lines 242a,b,c,d. Referring to the amplifier 240a, for example, the amplifier 240a receives auto feedback, or feedback from itself, via the line 242a. In similar fashion, cross-feedback is received from the amplifier 240b via the feedback line 242b, and so on for the remaining feedback lines 242c,d connected to the amplifier 240a. In FIG. 4, the four feedback lines 242a,b,c,d are thus shown as feeding the amplifier 240a. Generally, the network is configured such that the number of feedback lines is equal to the number of amplifiers N in the network.

In the embodiment of a Hopfield network shown in FIG. 4, a set of variable gain amplifiers 244a,b,c,d are interposed in the feedback lines 242a feeding amplifier 240a. Although not shown, similar amplifiers would be interposed in the feedback lines feeding the remaining $N-1$ amplifiers.

The variable gain amplifiers 244 have their gains controlled by a set of feedback weight lines 246a,b,c,d. The feedback weight lines 246 carry voltages to the variable gain amplifiers 244 that are defined as $T_{jk}$. In one preferred embodiment, the weights $T_{jk}$ are a function of sampled amplitudes $|y(j\Delta)|$ generated by the angle demodulator 200 (FIG. 3). In an embodiment where signal amplitude is constant, the weights $T_{jk}$ could be constant.

The amplifiers 240 thus act to sum the weighted feedback signals which are fed into the amplifiers 240 by the feedback lines 242. The stable state of the network is governed by varying currents across a set of bias lines 248. In the angle demodulator 200 (FIG. 3), the bias currents, or signals, transmitted across the bias lines 248 are, in turn, a function of the sampled angle $\alpha(j\Delta)$ and a summation of feedback weights $T_{jk}$. The outputs of the amplifiers 240 (representing the output of the Hopfield network) may be sampled across the lines 250a,b,c,d.

In the angle demodulator 200 of FIG. 3, if the convergence time of the Hopfield network is sufficiently short, then maximum overlap can be used, such that each estimated sample is at the center of its own K-sample block (FIG. 2a). For network convergence times between ten and one $\mu$s, and in view of Nyquist's theorem, the bandwidth of the demodulated phase function $\theta(t)$ can be between 50 kHz and 500 kHz if each sample is at the center of its own block.

Much higher bandwidths are allowed with the same Hopfield network if the blocks overlap by fifty percent and samples in the middle half of each block are saved since the network need only converge every K/2 samples, rather than at every sample period. For a network developed at the Jet Propulsion Laboratory in Pasadena, Calif. by A. Moopenn and A. P. Thakoor, (see, e.g., "Electronic Implementation of Associative Memory Based on Neural Network Models", IEEE Transactions on Systems, Man and Cybernetics, Vol. SMC-17, No. 2, March-April, 1987, pp. 325-331; "Programmable Synaptic Devices for Electronic Neural Nets", Proc. 5th IASTED Int'l Conf. on Expert Systems and Neural Networks, Aug., 1989, pp. 36-40) having K=64 inputs, K/2=32 estimated phase samples can be obtained at ten to one $\mu$s intervals from the middle halves of overlapping 64-sample-long blocks (FIG. 2b), yielding an effective output sampling rate of from 3.2 to 32 samples per $\mu$s. The corresponding bandwidth of the phase function $\theta(t)$ is between 1.6 MHz and 16 MHz.

If feedback weights as well as bias currents are modified in order to emulate an adaptive MAP demodulator with a Hopfield network, then the time necessary to modify the weights within the crossbar network must be added to the convergence time. This extra set-up may necessitate the use of 50% overlapping data blocks in some applications.

The required Hopfield implementation is obtained by comparing the MAP iteration equation (5) with the discrete-time update equation of a Hopfield network. For convenience, the Hopfield network is generalized such that each operational amplifier in the network is allowed to feedback to itself, as well as to all the other amplifiers as shown in FIG. 4. Auto-feedback does not upset the stability of the network; stability is assured by the sigmoid nonlinearities at the outputs of the operational amplifiers, which limit the maximum output voltage of each amplifier to unity, e.g., input and output voltages between 0V and 1V.

In the Hopfield network, the output of each operational amplifier is nonlinearly distorted by the amplifier so as to lie in the interval (0,1) and is fed back to every other element as shown in FIG. 4. The $k^{th}$ processing element has output voltage defined by the following equation:

$$v(k,t) = g[w(k,t)] \tag{6}$$

where $g(x)$ is a smooth, monotonically nondecreasing sigmoid function with minimum value zero and maximum value one and $w(k,t)$ is the input voltage of the $k^{th}$ amplifier.

The signal $w(k,t)$ within the $k^{th}$ processing element obeys the following update equation:

$$(d/dt)w(k,t) = -w(k,t)/\tau_k + \sum_{j=1}^{K} T_{kj}v(j,t) + b(k) \tag{7}$$

where $\tau_k$ is a resistor-capacitor (RC) time constant that can be set equal to unity for convenience, $T_{kj}$ are elements of a feedback connectivity matrix, $v(j,t)$ is an output voltage from the $j^{th}$ amplifier, and $b(k)$ is a constant bias current.

The discrete-time update equation of a Hopfield network is obtained from equations (6) and (7) by letting $w(k,i)$ denote the input voltage to the sigmoid nonlinearity at the output of the $k^{th}$ operational amplifier at time $i\mu$, where $\mu$ is the sampling interval. The time derivative in equation (7) at time $i\mu$ is then approximated as follows:

$$(d/dt)w(k,t)|_{t=i\mu} \approx [w(k,i+1) - w(k,i)]/\mu \tag{8}$$

where the approximation can be taken as exact for very small $\mu$. Assuming that $\tau_k$ equals one, equation (7) becomes $$w(k,i+1) = (1-\mu)w(k,i) + \mu\left(\sum_{j=1}^{K} T_{kj}v(j,i) + b(k)\right). \tag{9}$$

In equation (9), $w(k,i)$ is the output voltage of the $k^{th}$ operational amplifier at time $i\mu$, before the voltage is passed through the memoryless sigmoid nonlinearity $g(\cdot)$ in the amplifier to form the observed output voltage $v(k,i) = g[w(k,i)]$, where $g(-\infty) = 0$, $g(0) = \frac{1}{2}$, and $g(\infty) = 1$. The feedback weight from the $j^{th}$ operational amplifier output $v(j,i)$ to the input of the $k^{th}$ operational amplifier is $T_{kj}$. The bias current of the $k^{th}$ operational amplifier is $b(k)$ and the RC time constant $\tau_i$ of the $i^{th}$ operational amplifier is assumed to be unity.

If the input voltage to the $k^{th}$ amplifier at time $i\mu$ $|w(k,i)|$ is very large, the right hand side of equation (9) is approximately $(1-\mu)w(k,i)$, where $0<(1-\mu)<1$ since $0<\mu<<1$. The network thus stabilizes large-positive or large-negative excursions by reducing their absolute values; $|w(k,i+1)| < |w(k,i)|$ for very large $|w(k,i)|$, even when auto-feedback ($T_{ii}\neq 0$) is used.

Letting $\hat{\epsilon}(k\Delta)$ denote the difference between the unknown MAP phase estimate $\hat{\theta}(k\Delta)$ and the measured phase $\alpha(k\Delta)$ at time $k\Delta$, and similarly for the predicted mean error $\epsilon_m(k\Delta)$, results in the following pair of equations:

$$\hat{\epsilon}(k\Delta) = \hat{\theta}(k) - \alpha(k\Delta) \tag{10}$$

$$\epsilon_m(k\Delta) = \theta_m(k\Delta) - \alpha(k\Delta) \tag{11}$$

Substituting equations (10) and (11) into the discrete time equation for MAP phase estimation, equation (4), the equation for MAP phase estimation can be written as follows:

$$\hat{\epsilon}(k\Delta) - \epsilon_m(k\Delta) + \tag{12}$$

$$\sum_{j=1}^{K} \sigma_n^{-2}(j\Delta)A(j\Delta)|y(j\Delta)|R_\theta[(k-j)\Delta]\sin[\hat{\epsilon}(j\Delta)] = 0$$

The corresponding iterative version of MAP phase estimation from equation (5) is as follows:

$$\hat{\epsilon}_{i+1}(k\Delta) = \hat{\epsilon}_i(k\Delta) - \mu\{\hat{\epsilon}_i(k\Delta) - \epsilon_m(k\Delta) + \tag{13}$$

$$\sum_{j=1}^{K} \sigma_n^{-2}(j\Delta)A(j\Delta)|y(j\Delta)|R_\theta[(k-j)\Delta]\sin[\hat{\epsilon}_i(j\Delta)]$$

or $$\hat{\epsilon}_{i+1}(k\Delta) = (1-\mu)\hat{\epsilon}_i(k\Delta) + \mu\left(\epsilon_m(k\Delta) - \right. \tag{14}$$

$$\left. \sum_{j=1}^{K} \sigma_n^{-2}(j\Delta)A(j\Delta)|y(j\Delta)|R_\theta[(k-j)\Delta]\sin[\hat{\epsilon}_i(j\Delta)] \right).$$

A significant result of the present invention is that the Hopfield network update equation (9) can be made the same as the iterative MAP phase estimation equation (14) for properly chosen network parameters. Beginning with the network parameter defined as the sigmoid nonlinearity, let $$g(\epsilon) = (\tfrac{1}{2})[\sin(\epsilon) + 1], \quad -\pi/2 < \epsilon < \pi/2 \tag{15}$$
$$= 0, \epsilon \leq -\pi/2$$
$$= 1, \epsilon \geq \pi/2$$

If $w(k,i) = \epsilon_i(k\Delta)$ and $|\epsilon_i(k\Delta)| \leq \pi/2$, the Hopfield network update equation (9) becomes:

$$\epsilon_{I+1}(k\Delta) = (1-\mu)\epsilon_i(k\Delta) + \tag{16}$$

$$\mu\left((\tfrac{1}{2})\sum_{j=1}^{K} T_{kj}\{\sin[\epsilon_i(j\Delta)] + 1\} + b(k)\right)$$

$$= (1-\mu)\epsilon_i(k\Delta) +$$

$$\mu\left((\tfrac{1}{2})\sum_{j=1}^{K} T_{kj}\sin[\epsilon_i(j\Delta)] + (\tfrac{1}{2})\sum_{j=1}^{K} T_{kj} + b(k)\right)$$

To make equation (16) the same as the iterative MAP update equation (14), let $$T_{kj} = -2\sigma_n^{-2}(j\Delta)A(j\Delta)|y(j\Delta)|R_\theta[(k-j)\Delta] \tag{17}$$

$$b(k) = \epsilon_m(k\Delta) - (\tfrac{1}{2})\sum_{j=1}^{K} T_{kj} \tag{18}$$

-continued $$= \theta_m(k\Delta) - \alpha(k\Delta) + \sum_{j=1}^{K} \sigma_n^{-2}(j\Delta)A(j\Delta)|y(j\Delta)|R_\theta[(k-j)\Delta]$$

with $g(\epsilon)$ defined as in (15). Letting $\underline{\epsilon}_\infty$ denote the loop voltages after convergence of the Hopfield network, the desired phase estimates are defined by the following equation $$\hat{\theta}(k\Delta) = \epsilon_\infty(k\Delta) + \alpha(k\Delta) \qquad (19)$$

where $\epsilon_\infty(k\Delta)$ is obtained by mapping the corresponding operational amplifier output $v_\infty(k\Delta)$ through $g^{-1}(\cdot)$ as follows:

$$\epsilon_\infty(k\Delta) = g^{-1}[v_\infty(k\Delta)] = \sin^{-1}[2v_\infty(k\Delta) - 1]. \qquad (20)$$

Thus, applying equations (17) and (18) to the angle demodulator 200 (FIG. 3), for given prior mean value $\theta_m(k\Delta)$, phase covariance matrix values $R_\theta[(k-j)\Delta]$, average noise power $\sigma_n^2(j\Delta)$, and signal amplitude $A(j\Delta)$, the inputs to the Hopfield network are $\alpha(k\Delta)$ and $|y(k\Delta)|$, $k=1,2,...,K$. The measured amplitude $|y(j\Delta)|$ affects the feedback weights of the network, while the measured phase $\alpha(k\Delta)$ contributes to the bias current of the $k^{th}$ operational amplifier. The prior mean value $\theta_m(k\Delta)$ also affects the bias currents.

Figure 5:
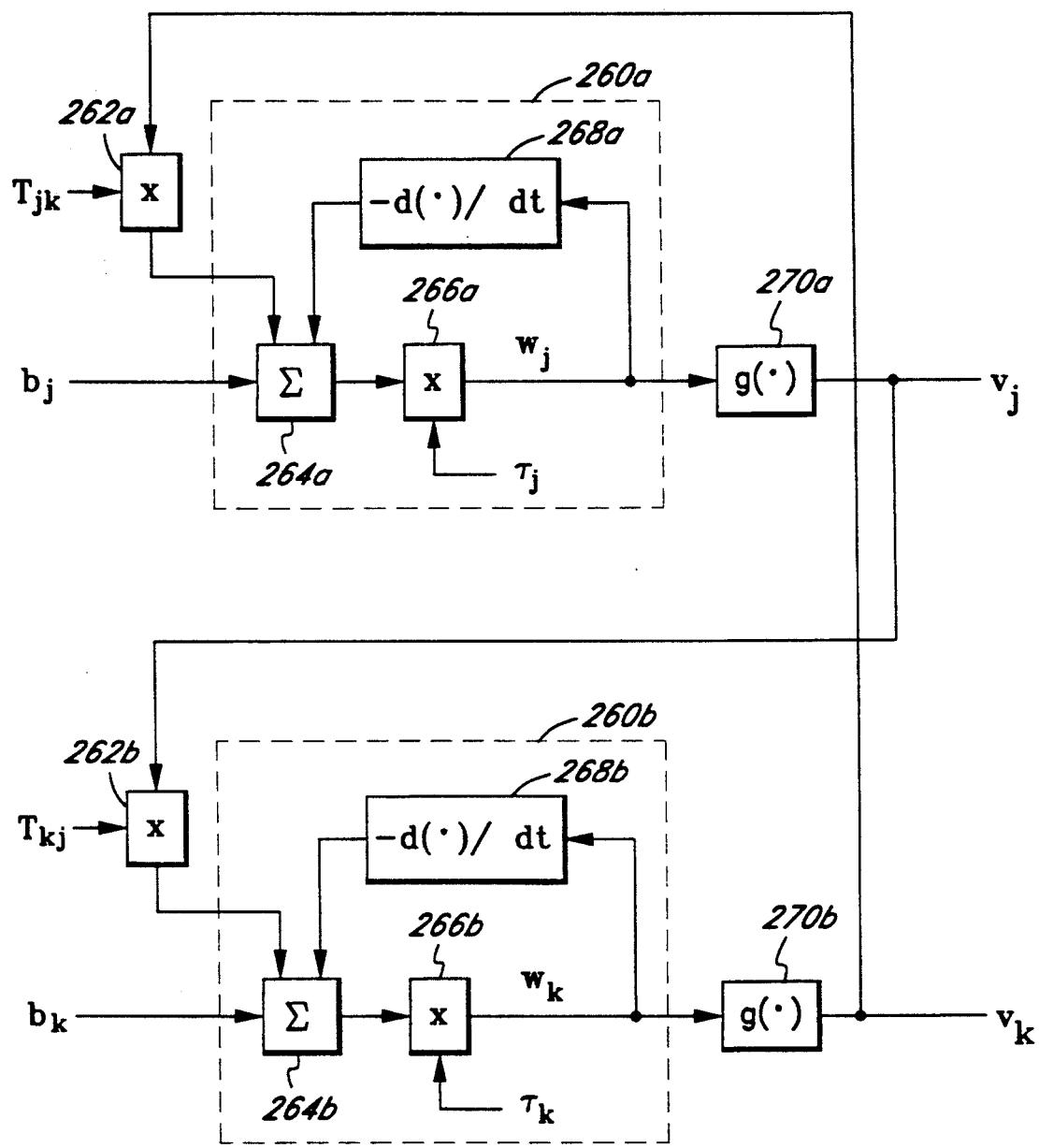
FIG. 5 is a block diagram of two amplifiers with feedback connections as used in the Hopfield network shown in FIG. 4.

FIG. 5 illustrates two elements, j and k, of a preferred embodiment of the Hopfield network 214 (FIG. 3) included in the present invention. The operational amplifiers 260a,b are respectively connected to the external bias signals $b_j$, $b_k$ and feedback weight signals $T_{jk}$, $T_{kj}$ via the variable gain amplifiers 262a,b. The variable gain amplifiers 262 receive their input current from feedback lines (only cross-feedback lines are shown).

The operational amplifiers 260a,b are linear devices comprising, respectively, summing amplifiers 264a,b. The summing amplifiers 264 sum all of the weighted feedback signals including the bias currents $b_j$, $b_k$. In the block diagram of FIG. 5, the output of each summing amplifier 264 is fed into multipliers 266a,b where the summed signal is multiplied by the time constant $\tau_k$. The resultant signal is output from the operational amplifier 260 and fed back to the summing amplifiers 264 through derivative devices 268a,b. In an actual analog circuit, the derivative operation and associated time constant are a consequence of feedback of the linear amplifier output through a resistor and capacitor connected in parallel. The output of each amplifier 260 is also fed to a nonlinear filter 270 to implement a nonlinear function such as the sigmoid nonlinearity defined in equation (15).

Figure 6:
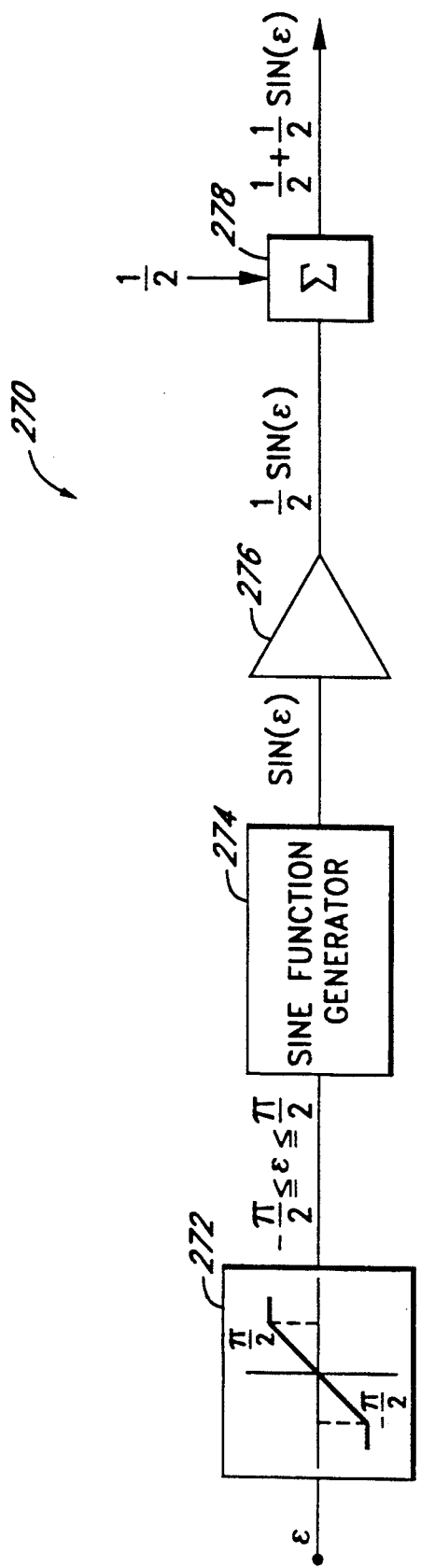
FIG. 6 is a block diagram of one preferred memoryless nonlinear filter circuit, shown in FIG. 5, used to generate a nonlinear sigmoid function.

Referring now to the block diagram of FIG. 6, one preferred embodiment of the nonlinear filter 270 for implementing equation (15) includes a hard limiter 272 to clip or limit the input signal $\epsilon$ to take on values between $-\pi/2$ and $\pi/2$. The limited input signal is thereafter fed to a sinewave generator 274 such as, for example, the AD639 distributed by Analog Devices. The output of the generator 274 is the trigonometric function $\sin(\epsilon)$. The sinewave is fed into an amplifier 276 wherein the gain is set to one-half. The resultant signal is received by a summing amplifier 278 that adds in a constant or dc signal of one-half, e.g., 0.5v.

Figure 7:
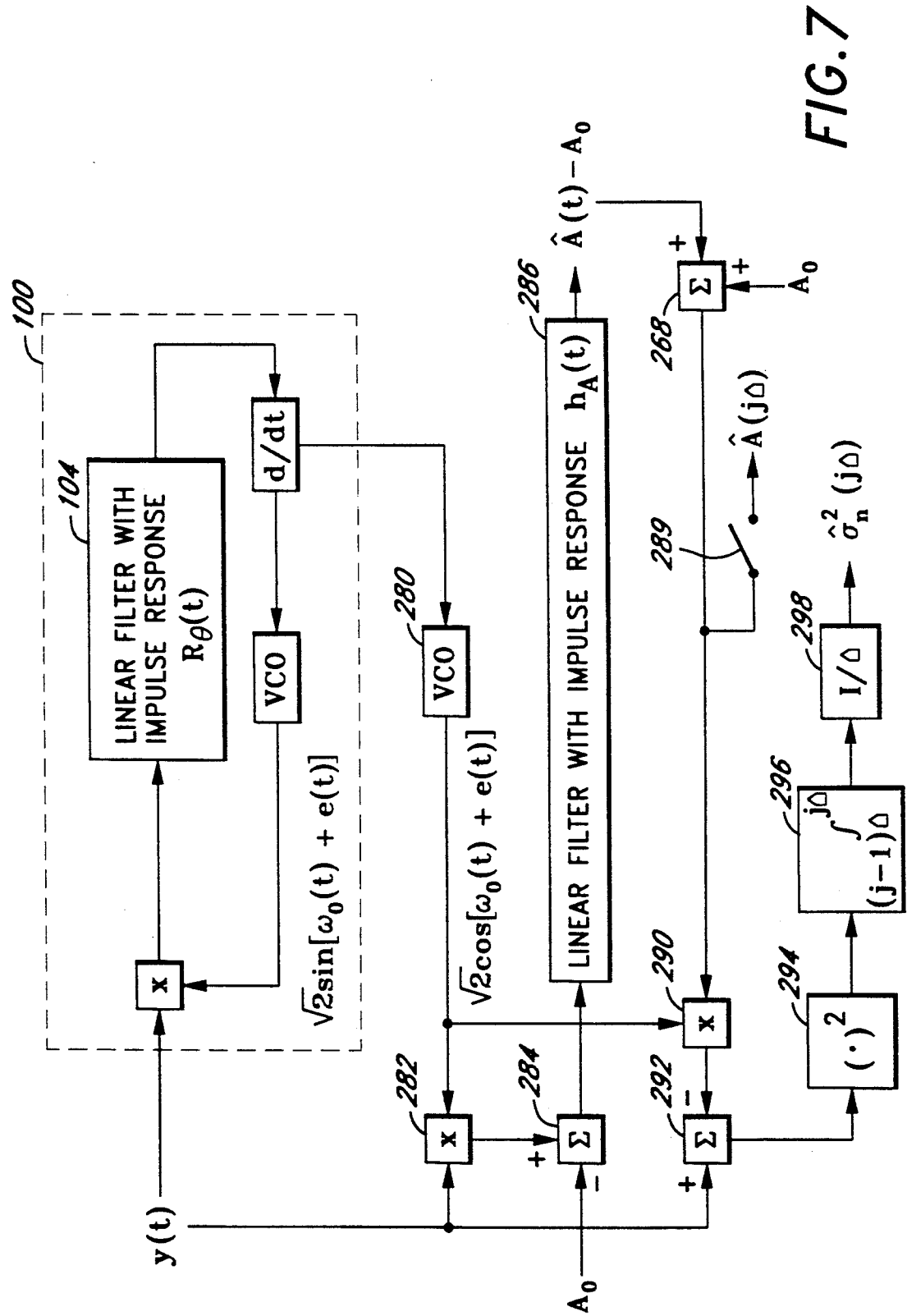
FIG. 7 is a block diagram of one presently preferred embodiment of an amplitude demodulator and noise power estimator having a phased-locked loop for providing amplitude and noise power parameters to the angle demodulator shown in FIG. 3.

FIG. 7 shows a phase-locked loop approximation to the optimum amplitude demodulator and noise power estimator at time $j\Delta$. The estimates thus provided are the inputs to the multiplier 222 of the angle demodulator 200 shown in FIG. 3. The block diagram of FIG. 7 includes components to approximate an optimum estimate of the amplitude component A(t) of the transmitted signal, which is a Wiener filtered version of the product of the time series data y(t) and the carrier term $\sqrt{2}\cos[\omega_0 t + \theta(t)]$ as follows:

$$\hat{A}(t) - A_o = \int_{-\infty}^{t} \{\sqrt{2}\,y(\tau)\cos[\omega_0\tau + \theta(\tau)] - A_o\}h(t - \tau)d\tau. \qquad (21)$$

where y(t) equals $\sqrt{2}[A(t) + A_o]\cos[\omega_0 t + \theta(t)]$+noise. Thus, in FIG. 7, a voltage-controlled oscillator 280, receiving a control signal from the phase-locked loop 100, provides a carrier signal to a multiplier 282. The multiplier 282 outputs the carrier signal multiplied by the received data y(t). The resultant value is input into a summing amplifier 284. The summing amplifier 284 also is fed a constant amplitude $A_o$. The result of the summing amplifier 284 is fed into a linear filter 286 to output the difference between the estimated amplitude $\hat{A}(t)$ and the constant amplitude $A_o$. The difference $\hat{A}(t) - A_o$ and the constant amplitude $A_o$ are then fed into a summing amplifier 288 to arrive at the estimated amplitude $\hat{A}(t)$. The output of the summing amplifier is then sampled at the system sampling period $\Delta$ by a sampling circuit 289 to produce an estimated amplitude $\hat{A}(j\Delta)$.

Another parameter that is input into the angle demodulator 200 of FIG. 3 is the estimated noise power at time $j\Delta$ which is defined as follows:

$$\hat{\sigma}_n^2(j\Delta) = E[y(j\Delta) - s(j\Delta)]^2 \approx (1/\Delta) \int_{(j-1)\Delta}^{j\Delta} \{y(t) - \qquad (22)$$

$$\sqrt{2}\,[\hat{A}(t) + A_o]\cos[\omega_0 t + \hat{\theta}(t)]\}^2 dt$$

The phase-locked loop approximation to the estimated noise power is achieved in FIG. 7 beginning from the path feeding the estimated amplitude $\hat{A}(j\Delta)$ into a multiplier 290. The estimated amplitude is multiplied by the carrier signal generated by the voltage-controlled oscillator 280. The carrier signal is thus also fed into the multiplier 290, and the resultant value is summed at a summing amplifier 292 with the received signal data y(t). The result of the summing amplifier 292 is fed into a squaring circuit 294 which feeds its results into an integrator 296. The output of the integrator 296 is divided by the sampling period at a block 298 thus providing the noise power estimate $\hat{\sigma}_n^2$ at time $j\Delta$.

If each estimated phase sample is computed from its own block of surrounding data samples (FIG. 2a), then all past estimates $\hat{\theta}(i\Delta)$, $i = k-1, k-2, \ldots, k-p$ are available for the predicted mean phase $\theta_m(k\Delta)$ generated by a phase predictor 212 (FIG. 3). A linear prediction of $\theta(k\Delta)$ based on past estimated phase values is a weighted sum of the past values as defined below:

$$\hat{\theta}_m(k\Delta) = \sum_{j=1}^{p} a_j \hat{\theta}[(k-j)\Delta]. \qquad (23)$$

For minimum mean-square error (MMSE) prediction, the weight vector $a = [a_1, a_2, \ldots, a_p]^T$ is defined by the following equation:

$$\mathbf{a} = C_\theta^{-1} \mathbf{r} \qquad (24)$$

where element i,j of $C_\theta$ is $E[\theta(i\Delta)\theta(j\Delta)]$ and the $i^{th}$ element of the column vector r is $E\{\theta(k\Delta)\theta[(k-i)\Delta]\}$. The matrix $C_\theta$ can be obtained from the phase covariance matrix $R_\theta$, since $$R_\theta = E[\underline{\theta}-\underline{\theta}_m)(\underline{\theta}-\underline{\theta}_m)^T = C_\theta - \underline{\theta}_m\underline{\theta}_m^T \quad (25)$$

where $\underline{\theta} = [\theta(\Delta), \theta(2\Delta), \ldots, \theta(K\Delta)]^T$, and the vector of mean values is $\underline{\theta}_m = [\theta_m(\Delta), \theta_m(2\Delta), \ldots, \theta_m(K\Delta)]^T$.

If phase samples are computed from 50% overlapping K-sample-long data blocks where only the estimates from the middle half of each block are saved (FIG. 2b), then a half-block of K/2 predicted prior mean values $\theta_m[(k-1+j)\Delta]$, $j=1,2,\ldots,K/2$ are to be obtained from an immediately preceding half-block of K/2 estimated sample values $\hat{\theta}[(k-j)\Delta]$, $j=1,2,\ldots,K/2$. The corresponding linear MMSE prediction is $$\hat{\underline{\theta}}_m = \hat{C}_{\theta_m\theta}\hat{C}_\theta^{-1}\hat{\underline{\theta}} \quad (26)$$

where
$\hat{\underline{\theta}}_m = [\hat{\theta}_m(k\Delta), \hat{\theta}_m[(k+1)\Delta], \ldots, \hat{\theta}_m(k-1+K/2)]]^T$,
$\hat{\underline{\theta}} = [\hat{\theta}(k-K/2), \hat{\theta}(k+1-K/2), \ldots, \hat{\theta}(k-1)]^T$,
$\hat{C}_{\theta_m\theta} = E[\underline{\theta}_m\underline{\theta}^T]$, and
$\hat{C}_\theta = E[\underline{\theta}\underline{\theta}^T]$, which should be the same as $C_\theta$ for a wide-sense stationery phase process, i.e., a process such that $E[\theta(i\Delta)\theta(j\Delta)]$ depends only on the time difference $(i-j)\Delta$.

The above regression techniques compute the predicted, or conditional, mean value of $\theta_m(k\Delta)$ given past estimates of $\theta(k\Delta)$. Use of the conditional mean as an estimate of $\theta_m(k\Delta)$ is theoretically consistent with the definition of $\theta_m(k\Delta)$ as the mean value of a prior distribution obtained from previous information. The actual value of $\theta_m(k\Delta)$ used in equation (4) is defined as follows:

$$\theta_m(k\Delta) = \text{mod}2\pi[\hat{\theta}_m(k\Delta)] \quad (27)$$

i.e., the MMSE prediction from phase unwrapped data, modulo $2\pi$.

An alternative method for computation of $\theta_m(k\Delta)$ from past data is given in the aforementioned article by Tufts and Francis. The advantage of the method given here is that, as in equation (4), the phase covariance matrix and similar expected values of pairwise products are used, thus making the whole demodulation process dependent upon assumed or estimated covariances of the phase data samples. An updated estimate of the phase covariance matrix can be obtained by forming a convex combination of the original a priori covariance matrix with the sample covariance matrix from each data block defined as:

$$R_\theta(i) = aR_\theta(i-1) + b[\underline{\alpha}(i)\underline{\alpha}(i)^T] \quad (28)$$

where $a+b=1$ (b is typically much less than a) and $\underline{\alpha}(i)$ is the vector of unwrapped phase measurements obtained directly from the $i^{th}$ K-sample data block as follows:

$$\underline{\alpha}(i) = [\alpha(Ki\Delta+\Delta), \alpha(Ki\Delta+2\Delta), \ldots, \alpha(Ki\Delta+K\Delta)]^T \quad (29)$$

The use of updated covariance estimates implies that estimation performance will improve as the receiver "learns" about the covariance characteristics of the source.

An updated estimate of the phase covariance matrix can thus be used to compute $\theta_m(k\Delta)$ and to change the feedback weights $T_{kj}$ in equation (17) from one data block to the next. A suboptimum but simpler phase demodulator is obtained by assuming that $\sigma_n^2(j\Delta)$ and $A(j\Delta)$ are constant over a block, and by using a fixed covariance matrix as in Tufts and Francis. If a fixed phase covariance matrix is used, the matrix inverse $C_\theta^{-1}$ can be precomputed and implemented as a weighted sum of data samples for predicting $\hat{\theta}_m$ from past $\hat{\underline{\theta}}$ estimates as in equation (24).

Figure 8:
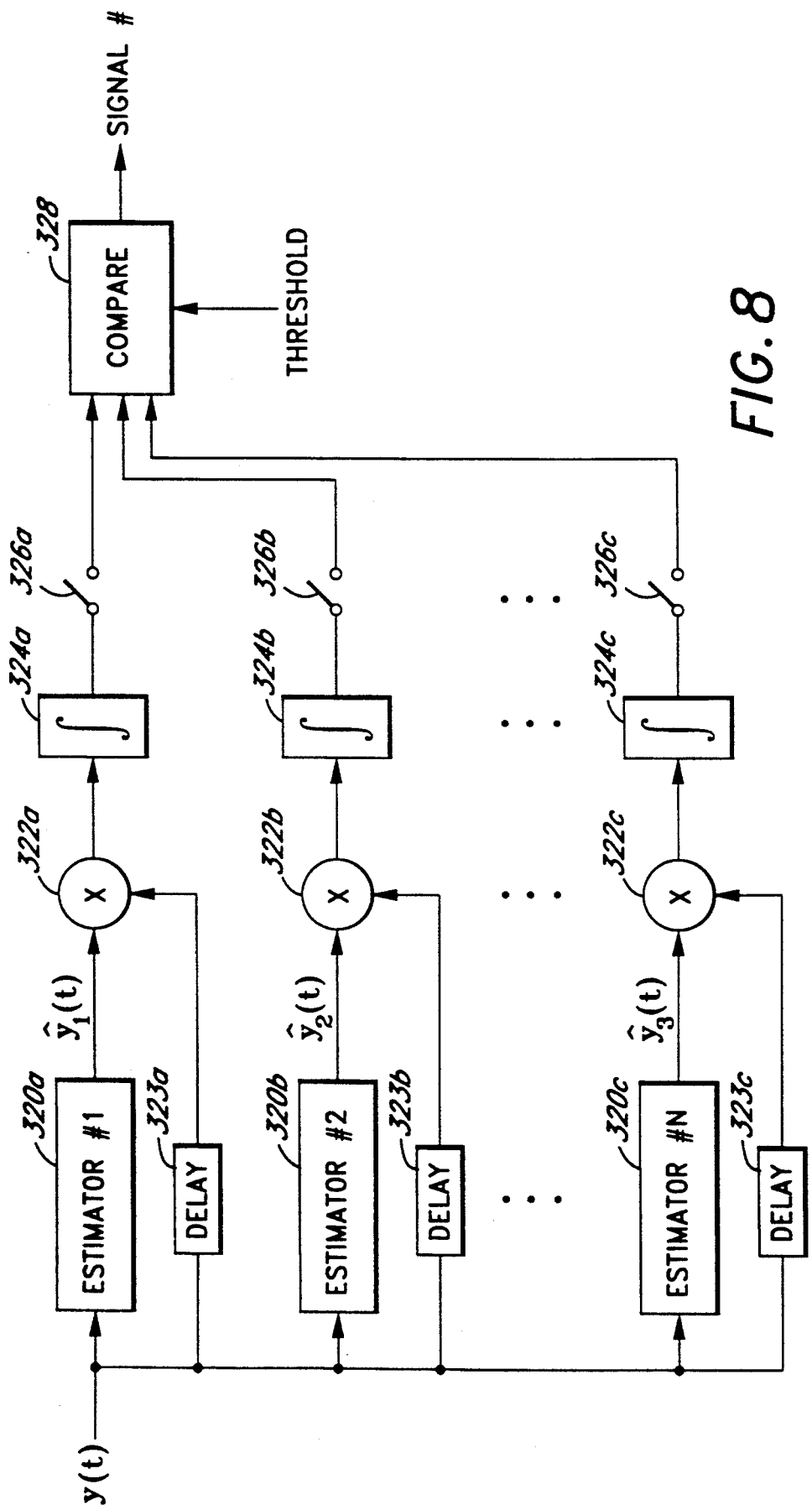
FIG. 8 is a block diagram of one presently preferred embodiment of a signal detector-classifier that incorporates the angle demodulator of the present invention.

FIG. 8 shows a block diagram of a signal classifier that incorporates the angle demodulator of the present invention. In FIG. 8, the received signal data y(t) is input to a set of estimators 320a,b,c. Each estimator demodulates the signal data y(t) to find the phase function $\theta(t)$ using phase covariance information (using the angle demodulator 200 shown in FIG. 3, for example) and then synthesizes a version of the input signal based on the estimated phase function. The synthesized signals output by the estimators 320 are correlated with the received data at a set of multipliers 322a,b,c. Since the estimators 320 contain devices that cause signal delays, a set of delays 323a,b,c are interposed between the incoming signal y(t) and the correlators 322 to properly synchronize the correlation process. The resulting correlation signals output from the multipliers 322 are integrated by a set of integrators 324 and thereafter sampled by a set of sampling circuits 326.

The classifications based on the bank of estimator-detectors have output signals that are compared to find the largest at a compare circuit 328. The compare circuit also determines whether the largest correlation is greater than a predetermined threshold. If the largest correlation is greater than the predetermined threshold, then the signal address associated therewith is generated by the compare circuit 328. The use of the phase covariance as a model of a given process implies a nonlinear estimation. This is in contrast to the usual form of estimator-correlator which employs a linear estimator based on covariance functions of "raw" data samples.

A Hopfield network with appropriate sigmoid nonlinearity is well matched to solving the nonlinear integral equation associated with optimum phase demodulation. The present invention represents a new and important use of the Hopfield network exploiting all aspects of the network, including nonlinear effects. It is believed that the present invention is a significant improvement over existing phase-locked loop circuitry which exists in many radio, television and other like receivers.

Although the above detailed description refers to electronic implementations of the angle demodulator and Hopfield network of the present invention, one skilled in the relevant technology will understand that other implementations are possible, including those implementations which utilize optics, e.g., as in N. H. Farhat, D. Psaltis, A. Prata, and E. Paek, "Optical Implementation of the Hopfield Model," Applied Optics 24 (1985), pp. 1469-1475, which is hereby incorporated by reference.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

I claim:

1. An angle demodulator for an input signal y(t), comprising:
   a network having a plurality of amplifiers each amplifier having a plurality of inputs, a bias b and an output wherein a set of feedback lines are connected between a selected set of amplifier outputs and a selected set of amplifier inputs; and
   block processing means for iteratively setting each amplifier bias as a function of the difference between a predicted mean phase estimate $\theta_m(j\Delta)$ and a measured phase $\alpha(j\Delta)$ at a time $j\Delta$, where $1 \leq j \leq K$ for a K-sample data block and $\Delta$ is a sampling period of signal data $y(j\Delta)$, the mean phase estimate provided to the block processing means and the block processing means including means for receiving the input signal.

2. The angle demodulator defined in claim 1, wherein:
   the network includes a variable gain amplifier interposed in each of the feedback lines having gain determined by a weight $T_{jk}$ wherein the kth amplifier outputs connects to one of the inputs of the jth amplifier; and
   the block processing means includes means for setting the amplifier feedback weights as a function of a measured amplitude of signal data $Y(j\Delta)$.

3. The angle demodulator defined in claim 1, additionally comprising a sigmoid nonlinearity device applied to each amplifier output so as to limit each amplifier output to a range between zero and one.

4. The angle demodulator defined in claim 3, wherein each of the amplifiers includes means for generating a weighted sum of the nonlinearly transformed amplifier outputs.

5. The angle demodulator defined in claim 1, wherein the sigmoid nonlinearity is defined as follows:

$$g(\epsilon) = (\tfrac{1}{2})[\sin(\epsilon) + 1], \quad -\pi/2 < \epsilon < \pi/2$$
$$= 0, \epsilon \leq \pi/2$$
$$= 1, \epsilon \geq \pi/2$$

where $\epsilon$ is the difference between the maximum a posteriori phase estimate and the measured phase.

6. The angle demodulator defined in claim 1, wherein each amplifier bias comprises a function of time-varying signal amplitude $A(j\Delta)$.

7. The angle demodulator defined in claim 2, wherein each feedback weight comprises a function of time-varying signal amplitude $A(j\Delta)$.

8. The angle demodulator defined in claim 1, wherein amplifier bias comprises a function of nonstationary noise having time-varying noise power $\sigma_n^2(k\Delta)$.

9. The angle demodulator defined in claim 2, wherein each feedback weight comprises a function of nonstationary white noise having time-varying noise power $\sigma_n^2(k\Delta)$.

10. The angle demodulator defined in claim 2, wherein the weight for the feedback line connecting the jth amplifier output to one input of the kth amplifier is defined as follows:

$$T_{kj} = -2\sigma_n^{-2}(j\Delta)A(j\Delta)|y(j\Delta)|R_\theta[(k-j)\Delta]$$

where
$\sigma_n^2(j\Delta)$ = noise power measurement at time $j\Delta$;
$A(j\Delta)$ = signal amplitude at time $j\Delta$;
$|y(j\Delta)|$ = measured amplitude at time $j\Delta$; and
$R_\theta[(k-j)\Delta]$ = phase covariance between the signal phase at time $j\Delta$ and the signal phase at time $k\Delta$.

11. The angle demodulator defined in claim 1, wherein as for the $k^{th}$ amplifier is defined as follows:

$$b(k) = \theta_m(k\Delta) - \alpha(k\Delta) + \sum_{j=1}^{K} \sigma_n^{-2}(j\Delta)A(j\Delta)|y(j\Delta)|R_\theta[(k-j)\Delta]$$

where
$\theta_m(k\Delta)$ = predicted mean phase at time $k\Delta$;
$\alpha(k\Delta)$ = measured phase at time $k\Delta$;
$\sigma_n^2(j\Delta)$ = noise power measurement at time $j\Delta$;
$A(j\Delta)$ = signal amplitude at time $j\Delta$;
$|y(j\Delta)|$ = measured amplitude at time $j\Delta$; and
$R_\theta[(k-j)\Delta]$ = phase covariance between the signal phase at time $j\Delta$ and the signal phase at time $k\Delta$.

12. A signal classifier comprising:
   a plurality of angle demodulators for an input signal y(t), comprising:
      a network having a plurality of amplifiers each amplifier having a plurality of inputs, a bias b and an output wherein a set of feedback lines are connected between a selected set of amplifier outputs and a selected set of amplifier inputs; and
      block processing means for iteratively setting each amplifier bias as a function of the difference between a predicted mean phase estimate $\theta_m(j\Delta)$ and a measured phase $\alpha(j\Delta)$ at a time $j\Delta$, where $1 \leq j \leq K$ for a K-sample data block and $\Delta$ is a sampling period of signal data $y(j\Delta)$, the mean phase estimate provided to the block processing means and the block processing means including means for receiving the input signal,
   wherein each angle demodulator modules a different phase modulation process by incorporating different phase covariance functions and wherein each said angle demodulator generates a synthesized signal.

13. The signal classifier defined in claim 12, additionally comprising:
   a plurality of correlators, each correlator for correlating one of the synthesized signals with the input signal; and
   a comparator for comparing the correlator outputs with a predetermined threshold thereby classifying the input signal according to the largest correlation value that exceeds the threshold.

14. An angle demodulation system, comprising:
   sampling means for generating periodic samples of quadrature components of a signal;
   means responsive to the sampling means for generating a plurality of measured phase samples at a predetermined number of sampling periods;
   means for comparing a mean phase sample predicted from past phase samples with each of the measured phase samples;
   a Hopfield network having bias inputs receivably connected to said comparing means, the Hopfield network providing a phase difference for each sample within a selected block of measured phase samples and a corresponding block of maximum a posteriori estimated phase samples; and
   means for summing each measured phase sample with each phase difference output by the Hopfield network so as to provide a phase estimate for each measured phase sample in the selected block.

15. The angle demodulation system defined in claim 14, additionally comprising:
means responsive to the sampling means for generating the amplitude of the signal at each predetermined sampling period;
memory means responsive to said amplitude generation means for storing a predetermined number of amplitude samples;
means for multiplying said stored amplitude samples by a phase angle covariance;
wherein the Hopfield network includes weight inputs receivably connected to said multiplying means.

16. The angle demodulation system defined in claim 14, additionally comprising memory means for storing a preselected number of phase estimates in each data block.

17. The angle demodulation system defined in claim 15, wherein said amplitude generation means includes means for scaling the amplitude by an expected noise power.

18. The angle demodulation system defined in claim 15, wherein said amplitude generation means includes means for scaling the amplitude by a time-varying signal amplitude.

19. A method of angle demodulation in a system having a feedback network of amplifiers wherein the network is paramaterized by a set of bias inputs, the method comprising the steps of:
receiving a signal;
predicting a block of mean phase samples of the signal over a preselected period;
obtaining a block of measured phase samples from the signal over the preselected period; and
comparing each measured phase sample to the corresponding predicted mean phase sample such that the difference forms the set of bias inputs to the network.

20. The method of angle demodulation defined in claim 19, wherein said network is additionally paramaterized by a set of feedback weights, the method additionally comprising the steps of:
obtaining a block of amplitude samples from the signal over a preselected period; and
scaling the amplitude samples by angle covariances, thereby forming the set of feedback weight inputs to the network.

21. The method of angle demodulation defined in claim 20, additionally comprising the step of scaling the amplitude samples by time-varying noise power.

22. The method of angle demodulation defined in claim 20, additionally comprising the step of scaling the amplitude samples by time-varying signal amplitude.

23. The method of angle demodulation defined in claim 19, wherein the method is performed iteratively until the network converges.

24. In an angle demodulation, a method of iteratively estimating a phase $\hat{\theta}(k\Delta)$ at a time $k\Delta$, where $k=1,2\ldots K$ and $\Delta$ is a sampling period, in a maximum a posteriori sense, said method comprising the steps of:
sampling a signal over a plurality of time periods;
generating amplitude and preliminary phase angle measurements for each of the samples;
linearly predicting each phase angle of the signal at times $k\Delta$, $k=1,2\ldots K$, as a weighted sum of past values wherein the weights of the weighted sum are determined by an estimated phase sample covariance function; and
estimating the signal phase at time $k\Delta$ as a function of the amplitude and preliminary phase angle measurements and the linearly predicted phase at samples within a selected block of samples containing the sample at time $k\Delta$.

25. The method defined in claim 24, wherein said linear predicting step includes the step of calculating an estimated mean phase as follows:

$$\hat{\theta}_m(k\Delta) = \sum_{j=1}^{p} a_j \hat{\theta}[(k-j)\Delta].$$

where
p=index of last sample period; and
$a_j$=linear predication weight.

26. The method defined in claim 25, wherein said predication weight $a_j$ belongs to a weight vector $a=[a_1,a_2,\ldots,a_p]^T$ which is calculated as $a=C_\theta^{-1}r$ where $C_{i,j}=E[\theta(i\Delta)\theta(j\Delta)]$ and $r_i=E[\theta(k\Delta)\theta[(k-i)\Delta]]$.

* * * * *

UNITED STATES PATENT AND TRADEMARK OFFICE
CERTIFICATE OF CORRECTION

PATENT NO. : 5,303,269
DATED : April 12, 1994
INVENTOR(S) : Richard A. Altes

It is certified that error appears in the above-indentified patent and that said Letters Patent is hereby corrected as shown below:

On title page, section 54 of the Patent, change "OPTICALLY" to --OPTIMAL--.

On title page, section 56, second column of the Patent, change "'Neurtal'" to --'Neural'--

On the title page, section 57, second line from the bottom of the Abstract of the Patent, change "angled modulators" to --angle demodulators--.

In column 1, line 2 of the Patent, change "OPTICALLY" to --OPTIMAL--.

In column 3, line 8 of the Patent, change "probability" to --Probability--.

In column 4, between lines 23 and 24 of the Patent, after the word "network" insert missing line, --and are generally associated with external data. In an--.

In column 8, line 33 of the Patent, change "inphase" to --in-phase--.

In column 12, line 50 of the Patent, change

" $\epsilon_{I+1}(k\Delta) = (1-\mu)\epsilon_i(k\Delta) + $ "

to

" $\epsilon_{i+1}(k\Delta) = (1-\mu)\epsilon_i(k\Delta) + $ "

UNITED STATES PATENT AND TRADEMARK OFFICE
CERTIFICATE OF CORRECTION

PATENT NO. : 5,303,269
DATED : April 12, 1994
INVENTOR(S) : Richard A. Altes

It is certified that error appears in the above-indentified patent and that said Letters Patent is hereby corrected as shown below:

In column 15, line 6 of the Patent, change

"$R_\theta = E[\theta-\theta_m)(\theta-\theta_m)^T = C_\theta-\theta_m\theta_m^T$"

to

--$R_\theta = E[(\theta-\theta_m)(\theta-\theta_m)^T] = C_\theta-\theta_m\theta_m^T$--.

In column 15, line 16 of the Patent, change

" $\theta[(k-j)\Delta], j=1,2,\ldots,K/2$ "

to

" $\hat{\theta}[(k-j)\Delta], j=1,2,\ldots,K/2$ "

In Claim 2, column 17, line 22 of the Patent, change "outputs" to --output--.

In Claim 2, column 17, line 26 of the Patent, change "Y(j$\Delta$)" to --y(j$\Delta$)--.

In Claim 12, column 18, line 35 of the Patent, change "modules" to --models--.

UNITED STATES PATENT AND TRADEMARK OFFICE
CERTIFICATE OF CORRECTION

PATENT NO. : 5,303,269
DATED : April 12, 1994
INVENTOR(S) : Richard A. Altes

It is certified that error appears in the above-indentified patent and that said Letters Patent is hereby corrected as shown below:

In Claim 24, column 20, line 13 of the Patent, change "demodulation" to --demodulator--.

Signed and Sealed this

Fifteenth Day of November, 1994

Attest:

BRUCE LEHMAN

Attesting Officer — Commissioner of Patents and Trademarks

UNITED STATES PATENT AND TRADEMARK OFFICE
CERTIFICATE OF CORRECTION

PATENT NO. : 5,303,269
DATED : April 12, 1994
INVENTOR(S) : Richard A. Altes

It is certified that error appears in the above-indentified patent and that said Letters Patent is hereby corrected as shown below:

On title page, section 54 of the Patent, change "OPTICALLY" to --OPTIMAL--.

On title page, section 56, second column of the Patent, change "'Neurtal'" to --'Neural'--

On the title page, section 57, second line from the bottom of the Abstract of the Patent, change "angled modulators" to --angle demodulators--.

In column 1, line 2 of the Patent, change "OPTICALLY" to --OPTIMAL--.

In column 3, line 8 of the Patent, change "probability" to --Probability--.

In column 4, between lines 23 and 24 of the Patent, after the word "network" insert missing line, --and are generally associated with external data. In an--.

In column 8, line 33 of the Patent, change "inphase" to --in-phase--.

In column 12, line 50 of the Patent, change

" $\epsilon_{I+1}(k\Delta) = (1-\mu)\epsilon_i(k\Delta) + $ "

to

" $\epsilon_{i+1}(k\Delta) = (1-\mu)\epsilon_i(k\Delta) + $ "

Page 1 of 3

UNITED STATES PATENT AND TRADEMARK OFFICE
CERTIFICATE OF CORRECTION

PATENT NO. : 5,303,269
DATED : April 12, 1994
INVENTOR(S) : Richard A. Altes

It is certified that error appears in the above-indentified patent and that said Letters Patent is hereby corrected as shown below:

In column 15, line 6 of the Patent, change

"$R_\theta = E[\theta-\theta_m) (\theta-\theta_m)^T = C_\theta - \theta_m \theta_m^T$"

to $-R_\theta = E[(\theta-\theta_m) (\theta-\theta_m)^T] = C_\theta - \theta_m \theta_m^T-$.

In column 15, line 16 of the Patent, change

" $\theta[(k-j)\Delta], j=1,2,\ldots,K/2$ "

to

" $\hat{\theta}[(k-j)\Delta], j=1,2,\ldots,K/2$ "

In Claim 2, column 17, line 22 of the Patent, change "outputs" to --output--.

In Claim 2, column 17, line 26 of the Patent, change "Y(j$\Delta$)" to --y(j$\Delta$)--.

In Claim 12, column 18, line 35 of the Patent, change "modules" to --models--.

UNITED STATES PATENT AND TRADEMARK OFFICE
CERTIFICATE OF CORRECTION

PATENT NO. : 5,303,269
DATED : April 12, 1994
INVENTOR(S) : Richard A. Altes

It is certified that error appears in the above-indentified patent and that said Letters Patent is hereby corrected as shown below:

In Claim 24, column 20, line 13 of the Patent, change "demodulation" to --demodulator--.

This certificate supersedes Certificate of Correction issued November 15, 1994.

Signed and Sealed this

Fourteenth Day of February, 1995

Attest:

BRUCE LEHMAN

Attesting Officer

Commissioner of Patents and Trademarks